(12) United States Patent
Ueda et al.

(10) Patent No.: US 6,743,497 B2
(45) Date of Patent: Jun. 1, 2004

(54) HONEYCOMB SANDWICH PANEL

(75) Inventors: Yutaka Ueda, Aichi-ken (JP); Masaki Morinaka, Aichi-ken (JP); Makoto Chujo, Otawara (JP); Tadashi Torigoe, Otawara (JP); Makiko Iida, Otawara (JP); Kazuyuki Tamada, Otawara (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/885,006

(22) Filed: Jun. 21, 2001

(65) Prior Publication Data

US 2002/0012767 A1 Jan. 31, 2002

(30) Foreign Application Priority Data

Jun. 27, 2000 (JP) ........................................ 2000-192889

(51) Int. Cl.⁷ ................................................ B32B 3/12
(52) U.S. Cl. ...................... 428/73; 428/116; 428/365; 428/367; 428/368; 428/593
(58) Field of Search .................... 428/116, 73, 174, 428/178, 188, 365, 367, 368, 593

(56) References Cited

U.S. PATENT DOCUMENTS

| 3,914,494 A | * | 10/1975 | Park |
| 4,465,725 A | | 8/1984 | Riel |
| 4,496,024 A | * | 1/1985 | Wolf et al. |
| 4,735,841 A | | 4/1988 | Sourdet |
| 5,543,198 A | * | 8/1996 | Wilson |
| 5,688,353 A | * | 11/1997 | Dublinski et al. |
| 6,117,518 A | * | 9/2000 | Cawse et al. |
| 6,251,497 B1 | * | 6/2001 | Hoopingarner et al. |
| 6,267,838 B1 | * | 7/2001 | Saugnac et al. |

FOREIGN PATENT DOCUMENTS

| EP | 0 624 462 A1 | 11/1994 |
| JP | 7-125118 | 5/1995 |
| JP | 11-320724 | 11/1999 |

OTHER PUBLICATIONS

Database WPI Section CH, Week 199338 Derwent XP002189620 JP 05 208465 Aug. 1993 abstract.
Database WPI Section CH, Week 199342 Derwent XP002189619 JP 05 237954 A Sep. 1993 Abstract.

* cited by examiner

Primary Examiner—Deborah Jones
Assistant Examiner—Wendy Boss
(74) Attorney, Agent, or Firm—Nixon & Vanderhye P.C.

(57) ABSTRACT

In a honeycomb sandwich panel having a honeycomb core, and a front surface layer and a rear surface layer sandwiching the honeycomb core on its upper and lower surfaces, at least one of the front surface layer and the rear surface layer is made of a fiber reinforced plastic using a phenolic resin as a matrix.

16 Claims, 4 Drawing Sheets

HONEYCOMB SANDWICH PANEL

CROSS-REFERENCE TO RELATED APPLICATIONS

This application is based upon and claims the benefit of priority from the prior Japanese Patent Application No. 2000-192889, filed Jun. 27, 2000, the entire contents of which are incorporated herein by reference.

BACKGROUND OF THE INVENTION

The present invention relates to a honeycomb sandwich panel for use in an interior material or a partition material or a structure member of an artificial satellite or a space station.

In the aerospace industry, a honeycomb sandwich panel, which is light and strong, is used as an interior material or a partition material or a structure member of an artificial satellite or a space station. The honeycomb sandwich panel comprises a honeycomb core made of, for example, aluminum, which constitutes a cell portion having a number of cells like a honeycomb. The honeycomb sandwich panel also comprises sheets of a front surface layer and a rear surface layer sandwiching the honeycomb core on both sides thereof so as to cover the openings of the cells.

It is known that the honeycomb sandwich panel is used in an artificial satellite or space equipment as disclosed in, for example, Jpn. Pat. Appln. KOKAI Publication No. 11-320724. The front and rear surface layers of the honeycomb sandwich panel are made of, for example, sheets of carbon fiber reinforced plastic (CFRP) or glass fiber reinforced plastic (GFRP). In general, the cells of the honeycomb core are hermetically sealed. The honeycomb sandwich panel for use in the space environment, in particular, must be resistant to a vacuum.

As described in the above publication, when the honeycomb sandwich panel is used in an artificial satellite or space equipment, the pressures inside and outside the cells of the honeycomb core are required to be the same. For this purpose, conventionally, air vents are formed on side walls of the cells, or slits are formed on a surface of the honeycomb core. In a vacuum, the air in the cells goes out through the air vents or slits. With this structure of the air vents in the side walls of the cells or the slits in the surface of the honeycomb core, force does not act in a direction to remove the front and rear surface layers from the honeycomb core by the pressure of air remaining in the honeycomb core.

However, since the honeycomb core has a number of cells, it is a difficult to process to make all the cells breathable. In addition, the front and rear surface layers are formed of a carbon fiber reinforced plastic, which does not have air-permeability. Therefore, if the panel is used in a space environment while air remains in the cells, the front and rear surface layers may be damaged or delaminated from the honeycomb core due to a difference in pressure between the inside and the outside of the honeycomb sandwich panel.

Further, if slits are formed on the surface of the honeycomb core, the strength of the core will be reduced and surface smoothness cannot be maintained. The smoothness of the surface of the honeycomb core may be ensured by using a method of adhering the honeycomb core to a hard surface plate. However, this method requires an additional step, resulting in an increase in cost.

In the case where the honeycomb core is made of aluminum, it is possible to form air vents on the side walls. However, since the air passages connected to the outside are formed on end faced (edge) of the panel, the formation of the air vents is limited by the shape of the end faces. Likewise, in the case where the honeycomb core is made of a carbon fiber reinforced plastic, the formation of the air vents is limited by the shape of the end faces of the panel.

Furthermore, according to Jpn. Pat. Appln. KOKAI Publication No. 11-320724, in order to make a honeycomb core breathable, an epoxy-based resin or a polyimide-based resin is combined with a fibrous base material, thereby forming a very thin fiber reinforced plastic with interstices, and a number of small holes are formed by the interstices in the fibrous base material. It is difficult to produce such a structure. In addition, the mechanical strength thereof is small.

BRIEF SUMMARY OF THE INVENTION

An object of the present invention is to provide a honeycomb sandwich panel, in which at least one of front and rear surface layers of a honeycomb panel is made of a fiber reinforced plastic using a phenolic resin as a matrix so that air permeability can be obtained, thereby providing resistance to a vacuum and high durability even when it is used in the space environment, without a troublesome process for forming air vents on the side walls of the cells of the honeycomb core.

According to the present invention, there is provided a honeycomb sandwich panel comprising a honeycomb core and front and rear surface layers sandwiching the honeycomb core on its upper and lower surfaces, in which at least one of the front and rear surface layers is made of a fiber reinforced plastic using a phenolic resin as a matrix.

With the above honeycomb sandwich panel, the honeycomb core is not breathable but the front or rear surface layer or both are porous and breathable. Therefore, when the panel is used in a vacuum, the air in the cells goes out through the front and rear surface layers. Thus, since no difference in pressure is made between the inside and the outside of the sandwich panel, the front and rear surface layers are prevented from being damaged or removed from the honeycomb core. As a result, the sandwich panel with high durability can be obtained. Moreover, even when the ambient pressure is returned to a normal pressure or increased above atmospheric pressure, since air flows into the honeycomb core, no excessive force is applied to the honeycomb sandwich panel. The honeycomb core may be made of Nomex®, a registered trademark of E. I. duPont de Nemours & Co., Wilmington, Del., for an aramid fiber, aluminum or a fiber reinforced plastic. Since the front and rear surface layers have air passages connected to the outside, the shape of the panel is not limited by the process for forming end faces (edge) of the panel but has a degree of freedom. For example, it is possible to form a panel or a structure member with a closed cross section to improve the torsional rigidity. Thus, the panel or a structure member has (much) more freedom of strength. Furthermore, since no special process is additionally required, the manufacturing cost can be saved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to FIGS. 1 and 2.

Figure 1:
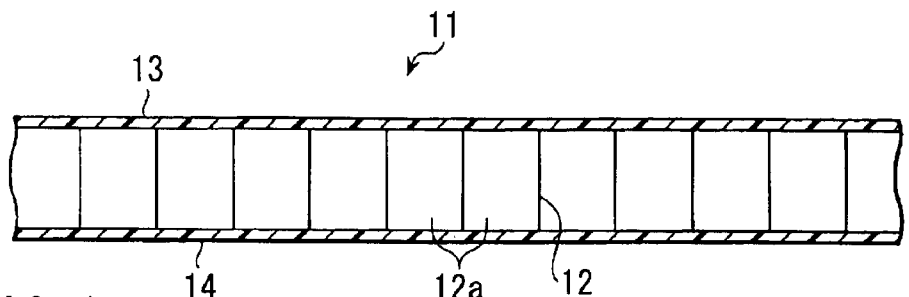
FIG. 1 is a longitudinal cross-sectional view of a honeycomb sandwich panel according to an embodiment of the present invention.
Figure 2:
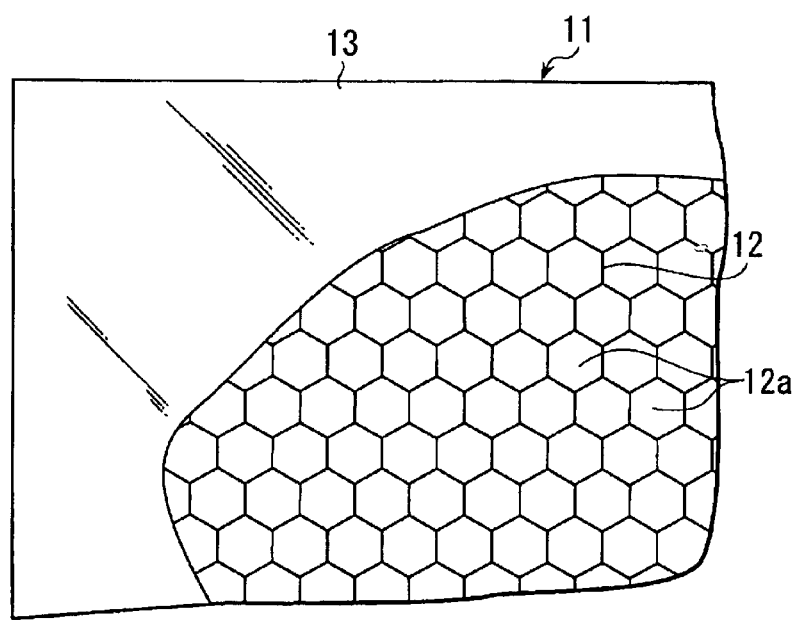
FIG. 2 is a plan view of the honeycomb sandwich panel of the embodiment in which a front surface layer is partially cutaway.

FIG. 1 is a longitudinal cross-sectional view of a honeycomb sandwich panel, and FIG. 2 is a plan view of the honeycomb sandwich panel in which a front surface layer is partially cut away. As shown in FIGS. 1 and 2, a honeycomb sandwich panel 11, which can be used as an interior material, partition material or structural member of an artificial satellite or a space station, comprises a honeycomb core 12. The honeycomb core 12 includes a number of cells 12a arranged like a honeycomb, which extend in the thickness direction through the core. The honeycomb sandwich panel 11 also comprises sheets of a front surface layer 13 and a rear surface layer 14 sandwiching the honeycomb core 12 on both sides thereof.

The honeycomb core 12 is integrally formed of a light metal such as aluminum, Nomex or a CFRP, as one piece. At least one of the front surface layer 13 and the rear surface layer 14 is made of a fiber reinforced plastic, such as a CFRP, an aramid fiber reinforced plastic or a GFRP. In any case, a phenolic resin is used as a matrix. The front and rear surface layers 13 and 14 are fused to the respective surfaces of the honeycomb core 12 so as to close the openings of the cells 12a. In the fiber reinforced plastic using a phenolic resin as a matrix, the phenolic resin is reinforced with carbon fibers or the like. The phenolic resin becomes porous when it is hardened, with the result that a breathable phenolic fiber reinforced plastic can be obtained. In this embodiment, each of the front and rear surface layers 13 and 14 is a two-ply sheet; however, it may be made of a single sheet, or three or more sheets.

A vacuum resistance test of the honeycomb sandwich panel will now be described.

A test piece of the honeycomb sandwich panel comprises a honeycomb core of a hexagonal HRH10–3/16–3.0 (t=12.7 mm) and front and rear surface layers made of a phenol CFRP prepreg, SRC-099E (produced by Sakura Rubber Co., Ltd.). The SRC-099E is so made that it is to be hardened and molded by an autoclave method, thereby forming the front and rear surface layers.

Figure 3:
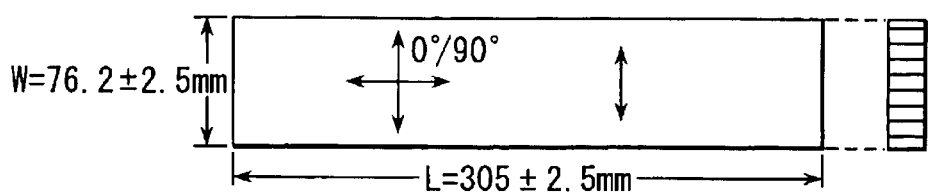
FIG. 3 is a plan view and a side view of a test piece.

As shown in FIG. 3, the dimensions of the test piece are 305±2.5 mm in length (L) and 76.2±2.5 mm in width. The cross fiber directions form angles of 0° and 90° with respect to the width direction of the test piece, as indicated by the crisscrossed arrows. The core ribbon direction coincides with the width direction of the test piece, as indicated by the right-hand arrow.

[The Number of Test Pieces]

Test pieces for vacuum resistance test (A1, A2 and A3): 3EA were prepared (for a vacuum resistance test and a drum peel test).

Comparison test pieces (B1, B2 and B3): 3EA were prepared (for only a drum peel test).

[Vacuum Resistance Test Apparatus and Method]

(1) Test Machine

A helium leak detector: MSE-11B automatic-type (2) Vacuum gage

A Pirani gage: RM-32A type (3) Vacuum chamber (made of stainless steel)

254 mm in inside diameter $\phi$, 360 mm in height (4) Depressurizing capacity (by actual measurement)

30 seconds later: about 4 Torr, 60 seconds later: about 0.2 Torr, and 120 seconds later: about 0.1 Torr.

(5) Vacuum resistance test method

Figure 4:
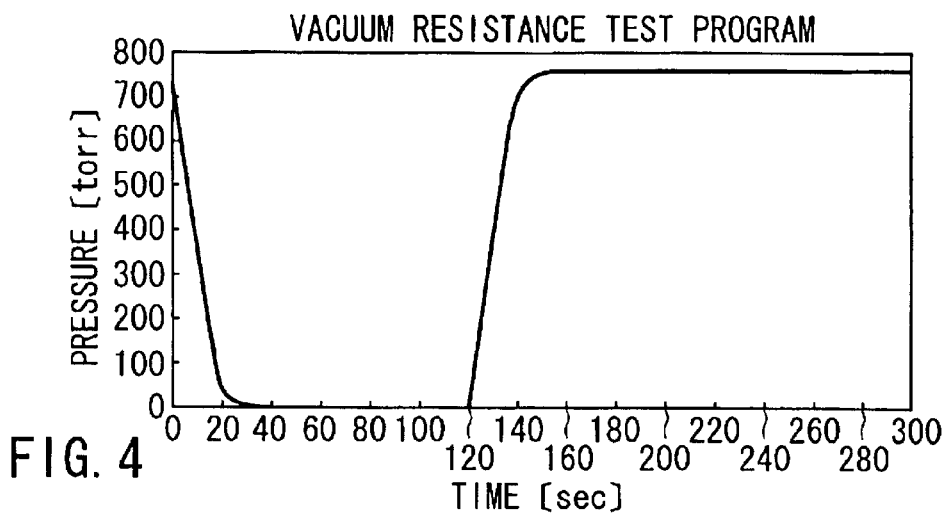
FIG. 4 is a graph showing results of a vacuum resistance test.

The test pieces (A1, A2 and A3) are put into the vacuum chamber. The vacuum pump of the helium leak detector is operated to depressurize and pressurize the chamber.

a. Test program (See the graph of FIG. 4.)

The vacuum chamber is depressurized for 120 seconds and pressurized for 180 seconds. The pressurization time is 60 seconds longer than the depressurization time, so that the degree of vacuum of the cells of the honeycomb core can be completely returned to atmospheric pressure. This cycle is repeated 20 times.

b. The number of test pieces

3EA (A1, A2 and A3)

(6) Observation of the panels after the test

To check whether the front and rear surface layers made of a CFRP are removed from the honeycomb core, a change of the outer appearance of the panel is observed and a sound of a tapping hammer is detected. The results of the observation are compared with those of honeycomb sandwich panels that have not been subjected to the vacuum resistance test.

[Comparison of the Peel Strength by a Drum Peel Test]

(1) Test Machine

Instron 4206-type general-purpose material testing machine

Load cell: 0.5-ton capacity

Load range: 5%

(2) Test jig

A drum peel test jig (3) Drum peel test method

A drum peel test is performed with respect to 6EA of the honeycomb sandwich panels (A1, A2 and A3) that had been subjected to the vacuum resistance test and the honeycomb sandwich panels (B1, B2 and B3) that have not been subjected thereto. In the drum peel test, it is examined, based on the peel strength, whether the CFRP was removed from the honeycomb core in the vacuum resistance test.

[Air Permeability Observation Test]

(1) Vacuum pump: FT3-200N produced by Kabushiki Kaisha Anlet (transliterated)

Figure 5:
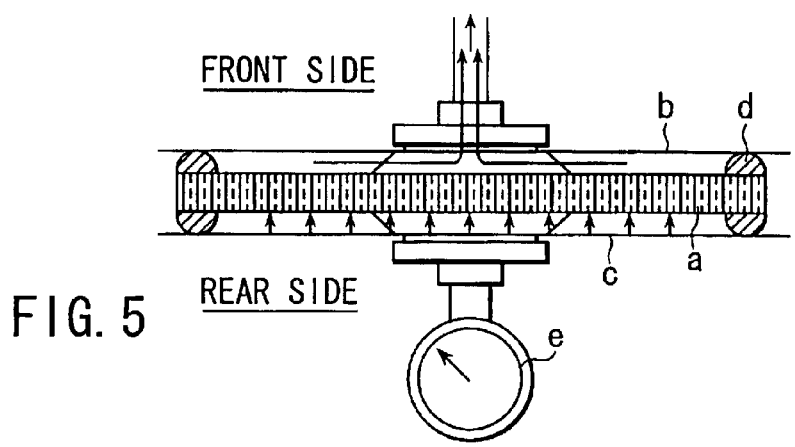
FIG. 5 is a structural diagram for explaining an air permeability observation test.

(2) Pressure gage: A Bourdon-tube gage with precision of Class 1.5, Management No. V-53, produced by Daiichi Keiki (3) Test method As shown in FIG. 5, a honeycomb sandwich panel a (the area: 180×180 mm, the core thickness: about 12.7 mm) has two-ply front and rear surface plates. Bagging films b and c are applied to the front and rear surfaces of the panel and sealed with silicon sealant d or the like. Then, the front surface side is evacuated. The degree of vacuum on the rear side at that time is measured by a gage e, thereby checking whether the two-ply CFRP has air permeability or not. It is considered that the process of decrease in pressure on the rear surface side during the evacuation reflects the decrease in pressure inside the honeycomb core.

[Results of Test]

(1) Observation of the panels after the vacuum resistance test

As indicated in Table 1, both the outer appearance of the panel and a sound of a tapping hammer were normal in all the honeycomb sandwich panels (A1, A2 and A3).

TABLE 1

| Test Piece No. | Outer Appearance | Sound of Tapping Hammer |
|---|---|---|
| A1 | Unchanged | Normal |
| A2 | Unchanged | Normal |
| A3 | Unchanged | Normal |

(2) Comparison of the results of the drum peel test

Figure 6:
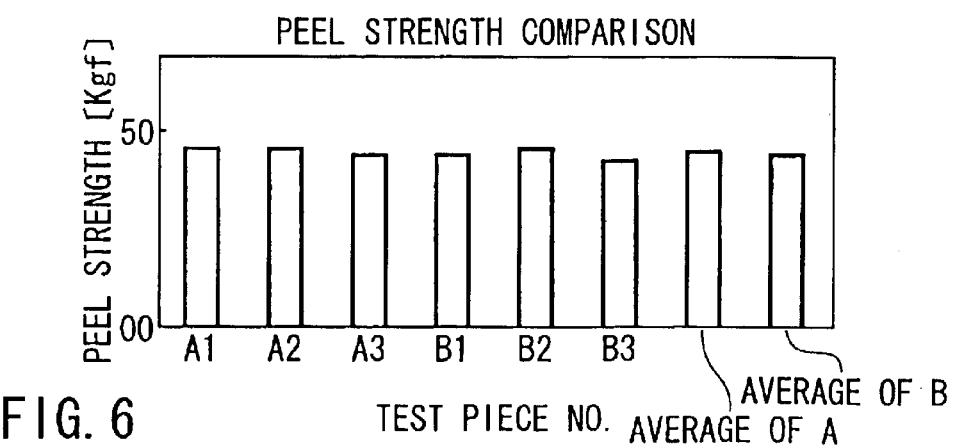
FIG. 6 is a graph showing a comparison of peel strength.

As shown in the graph of FIG. 6, there was no substantial difference in peel strength (kgf) between the honeycomb sandwich panels (A1, A2 and A3) that had been subjected to the vacuum resistance test and the honeycomb sandwich panels (B1, B2 and B3) that have not been subjected thereto.

(3) Results of permeability test

Figure 7A:
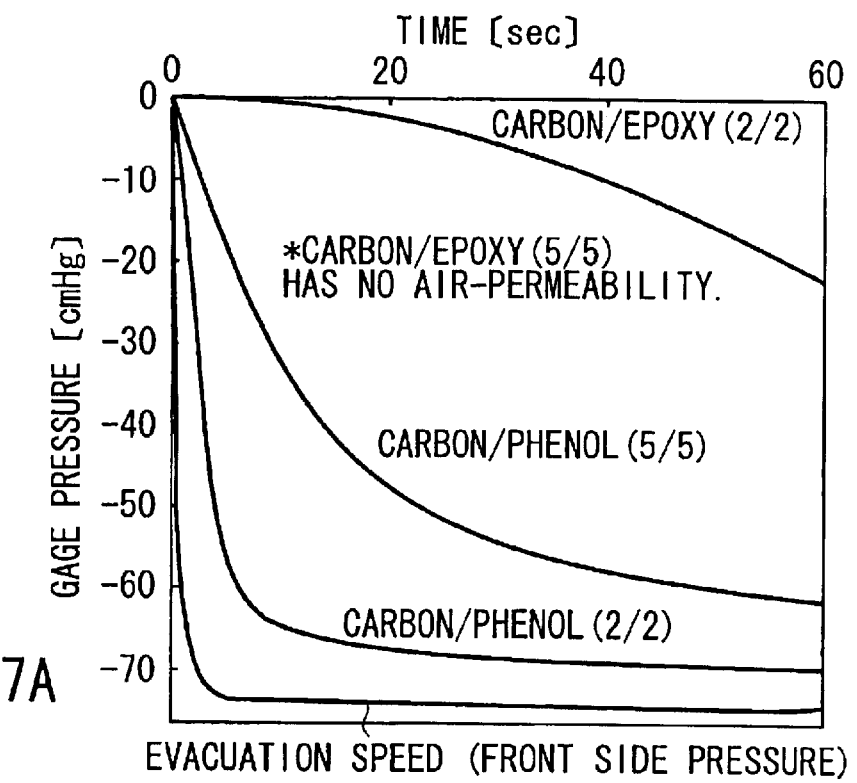
FIGS. 7A and 7B are graphs showing results of air permeability observation tests (under a decreasing pressure)
Figure 7B:
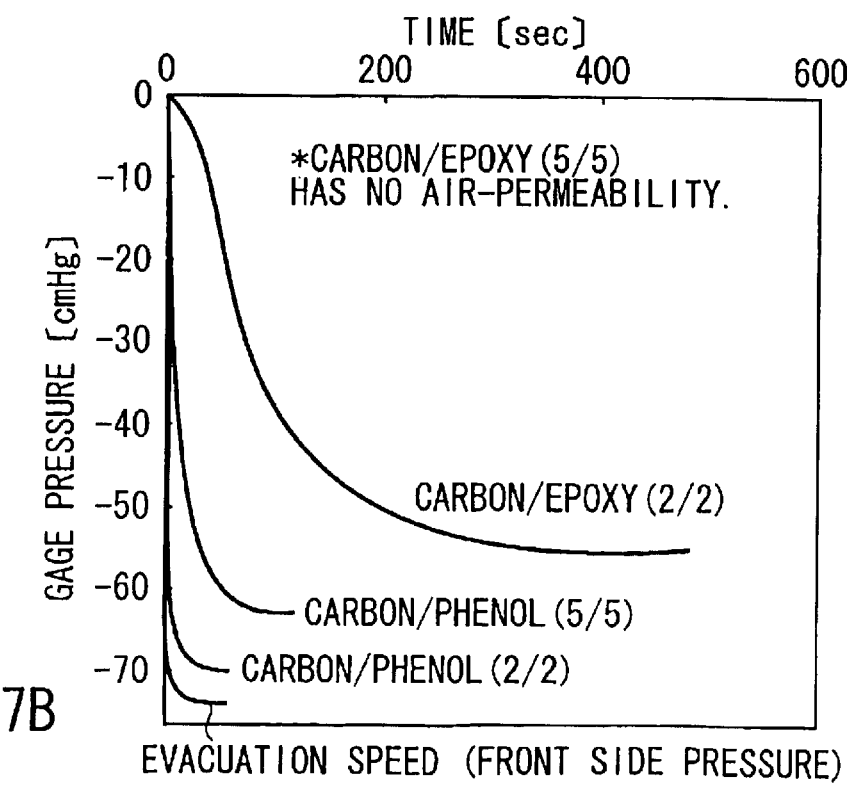

The graphs of FIGS. 7A and 7B show results of air permeability tests (under a decreasing pressure). In FIG. 7A, the horizontal axis indicates 60 seconds. In FIG. 7B, the horizontal axis indicates 600 seconds. Comparison of carbon/epoxy (2/2), carbon/phenolic (5/5) and carbon/phenolic (2/2) used as the front and rear surface layers shows that the carbon/phenolic (2/2) is the most breathable. It is noticed that the air permeability of a phenolic CFRP is about ten times that of an epoxy CFRP, when the periods of time required to reduce normal atmospheric pressure to $\frac{1}{10}$ atmospheric pressure are compared. Carbon/epoxy (5/5) has no air permeability.

Figure 8A:
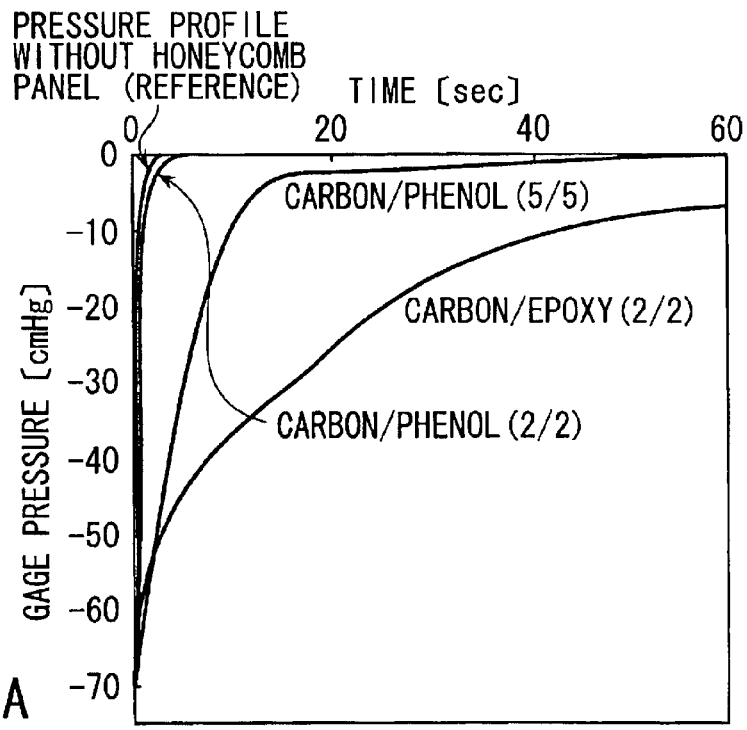
FIGS. 8A and 8B are graphs showing results of air permeability observation tests (under an increasing pressure).
Figure 8B:
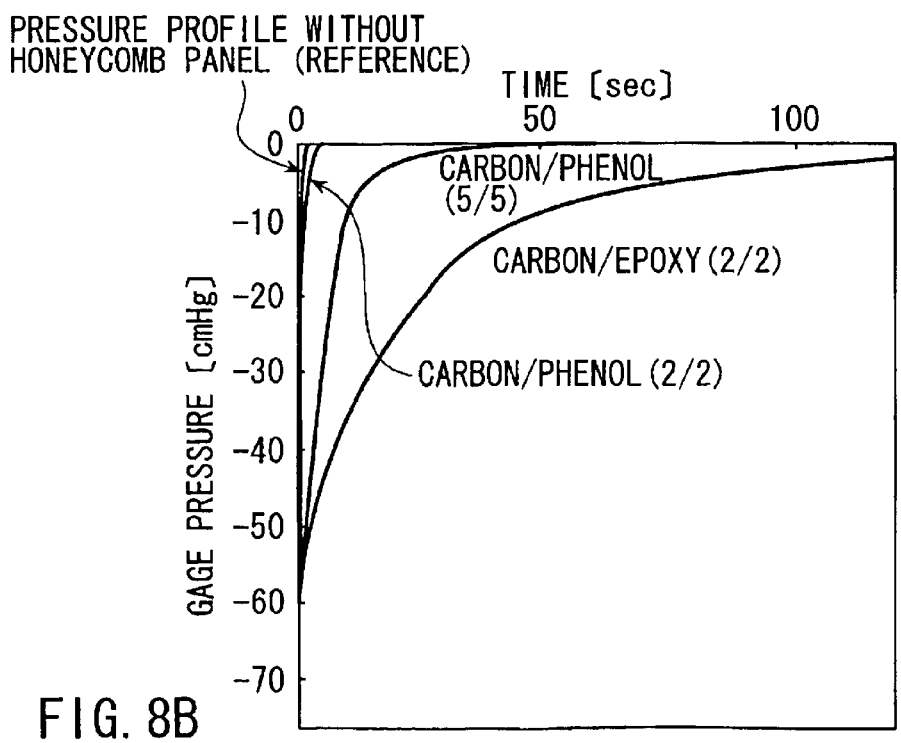

The graphs of FIGS. 8A and 8B show results of air permeability tests (when the reduced pressure is being increased to normal atmospheric pressure). In FIG. 8A, the horizontal axis indicates 60 seconds. In FIG. 8B, the horizontal axis indicates 120 seconds. Comparison of carbon/epoxy (2/2), carbon/phenolic (5/5) and carbon/phenolic (2/2) shows that the air permeability speed of the carbon/phenolic (2/2) is the highest. In other words, the shortest period of time is required to increase the pressure in the honeycomb sandwich panel to the normal atmospheric pressure.

The former numeral of "2/2", or "5/5" denotes the number of plies (lateral layers) of the front surface layer and the latter numeral denotes the number of plies of the rear surface layer. All the test pieces are obtained by an autoclave molding method.

As described above, the honeycomb sandwich panel is subjected to the vacuum resistance test, and then to the drum peel test to check whether the CFRP is surface layers are delaminated from the honeycomb core. The results of the drum peel test show that the panels which had and had not been subjected to the vacuum resistance have substantially the same peel strength. Therefore, it is clear that the CFRP is not surface layers are not delaminated from the honeycomb core by the change in pressure under the conditions of the vacuum resistance test program.

Further, the results of the air permeability test clearly show that the carbon/phenol (2/2) has high air permeability and that no delamination sound is detected. Therefore, the air goes out from or into the cells of the honeycomb core through the two-ply phenolic CFRP as the external pressure changes.

Based on the results of the experiments described above, it is confirmed that the honeycomb sandwich panel of the present invention can be used even in a vacuum owing to the air permeability of the fiber reinforced plastic using a phenolic resin as the matrix. Moreover, a later process for forming air vents on the side walls of the cells of the honeycomb core is not required, as in the conventional art. Therefore the number of steps is reduced, resulting in a reduction in cost. It is possible to form a panel or a structure member with a closed cross section to improve the torsional rigidity, thus, the panel or a structure member has (much) more freedom in designing to achieve required strength. The honeycomb sandwich panel is suitable as a component of equipment for use in the aerospace industry, but can be applied to any other field.

The present invention is characterized in that at least one of the front and rear surface layers of the honeycomb sandwich panel is made of a fiber reinforced plastic using a phenolic resin as the matrix. Therefore, the front or rear surface layer or both are breathable, so that the vacuum resistance and durability can be obtained even in the space environment, without a troublesome process for forming air vents on the side walls of the cell portion of the honeycomb core.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A honeycomb sandwich panel comprising:
   a honeycomb core having a number of cells extending therethrough in a thickness direction of the honeycomb core; and
   a front surface layer and a rear surface layer provided on both sides of the cells in the thickness direction of the honeycomb core and fused to close openings of the cells, at least one of the front surface layer and the rear surface layer being made of a porous and air-permeable fiber reinforced plastic using as a matrix a phenolic resin, which becomes porous and allows passage of air between inside and outside of the cells, when it has been cured after heating in an autoclave.

2. A honeycomb sandwich panel according to claim 1, wherein each of the front surface layer and the rear surface layer is made of at least a single layer.

3. A honeycomb sandwich panel according to claim 1, wherein the porous and air-permeable fiber reinforced plastic is a porous and air-permeable carbon fiber reinforced plastic.

4. A honeycomb sandwich panel according to claim 1, wherein the porous and air-permeable fiber reinforced plastic is a porous and air-permeable glass fiber reinforced plastic.

5. A honeycomb sandwich panel according to claim 1, wherein the honeycomb core is made of a light metal.

6. A honeycomb sandwich panel according to claim 1, wherein the honeycomb core is made of a material selected from the group consisting of an aramid fiber and a glass fiber reinforced plastic.

7. A honeycomb sandwich panel for use in an interior material, exterior material, partition material or structural member of a spacecraft comprising:
 a honeycomb core having a number of cells ex tending therethrough in a thickness direction of the honeycomb core; and
 a front surface layer and a rear surface layer provided on both sides of the cells in the thickness direction of the honeycomb core and fused to close openings of the cells, at least one of the front surface layer and the rear surface layer being made of a porous and air-permeable fiber reinforced plastic using as a matrix a phenolic resin, which becomes porous and allows passage of air between inside and outside of the cells, when it has been cured after heating in an autoclave.

8. A honeycomb sandwich panel according to claim 7, wherein each of the front surface layer and the rear surface layer is made of at least a single layer.

9. A honeycomb sandwich panel according to claim 7, wherein the porous and air-permeable fiber reinforced plastic is a porous and air-permeable carbon fiber reinforced plastic.

10. A honeycomb sandwich panel according to claim 7, wherein the porous and air-permeable fiber reinforced plastic is a porous and air-permeable glass fiber reinforced plastic.

11. A honeycomb sandwich panel according to claim 7, wherein the honeycomb core is made of a light metal.

12. A honeycomb sandwich panel according to claim 7, wherein the honeycomb core is made of a material selected from the group consisting of an aramid fiber and a glass fiber reinforced plastic.

13. A honeycomb sandwich panel according to claim 1, wherein each of the front surface layer and the rear surface layer is made of a plurality of layers.

14. A honeycomb sandwich panel according to claim 1, wherein the front surface layer and the rear surface layer become porous and allow passage of air in a thickness direction when it has been cured after heating.

15. A honeycomb sandwich panel according to claim 7, wherein each of the front surface layer and the rear surface layer is made of a plurality of layers.

16. A honeycomb sandwich panel according to claim 7, wherein the front surface layer and the rear surface layer become porous and allow passage of air in thickness direction, when it has been cured after heating.

* * * * *